Nov. 26, 1940.    R. P. PESCARA    2,222,913
CONTROL MECHANISM
Filed May 18, 1938    2 Sheets-Sheet 1

Inventor:
Raul Pateras Pescara,
Bailey Carson
Attorneys

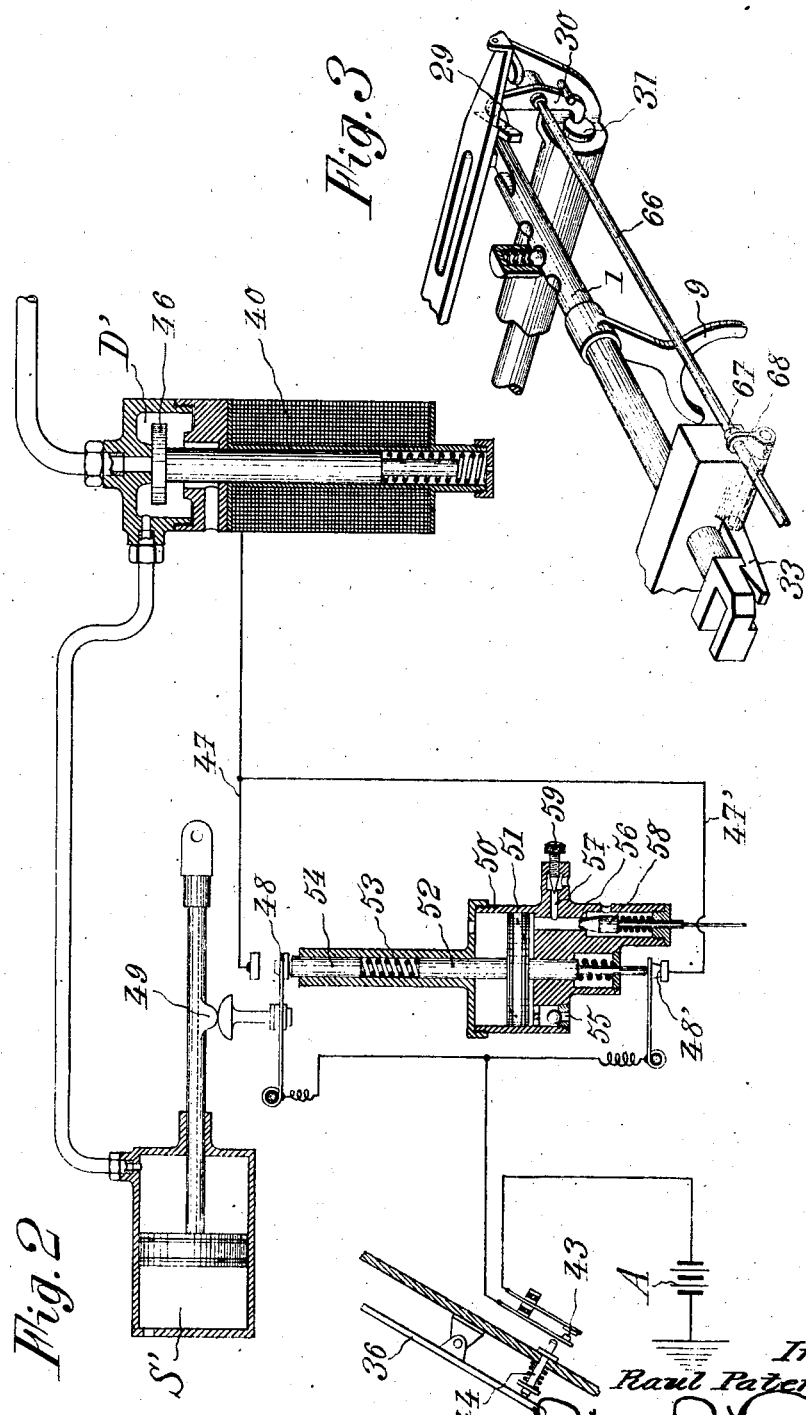

Patented Nov. 26, 1940

2,222,913

UNITED STATES PATENT OFFICE 2,222,913

CONTROL MECHANISM

Raul Pateras Pescara, Paris, France

Application May 18, 1938, Serial No. 208,714
In Luxemburg February 3, 1938

8 Claims. (Cl. 192—.01)

The present invention relates to control box mechanisms, especially for automobile vehicles, of the type described in my co-pending application Serial No. 208,713, filed May 18, 1938, which is characterized in that, at any time during the working of the system, at least within certain limits, the choice of the most favorable gear ratio which is to be utilized is automatically effected in accordance with variations in the speed of some moving part of the vehicle driven by the engine in combination with which said mechanism is working.

The object of the present invention is to provide improvements to control box mechanisms of this type.

With this object in view, according to a first feature of the present invention, I make use, for ensuring the clutch release and gear changing operations, of servo-motors which are controlled by a single operating member which may consist, in the case of an automobile vehicle, either of the clutch pedal, or, preferably, of the accelerator pedal.

According to another feature of the present invention, I provide a single member for effecting the release of the clutch and changing from one gear to another, and I arrange said member so that it can operate a free-wheel device, especially in order, in the case of a gear box for a vehicle, temporarily to disconnect said vehicle from said engine.

Other features of the present invention will result from the following detailed description of some specific embodiments thereof.

Preferred embodiments of the present invention will be hereinafter described with reference to the accompanying drawings, given merely by way of example, and in which:

Fig. 2 is a diagrammatical view of a modification of some elements of this gear box;

Fig. 3 is a perspective view of an automatic locking device for the reverse gear.

Figure 1:
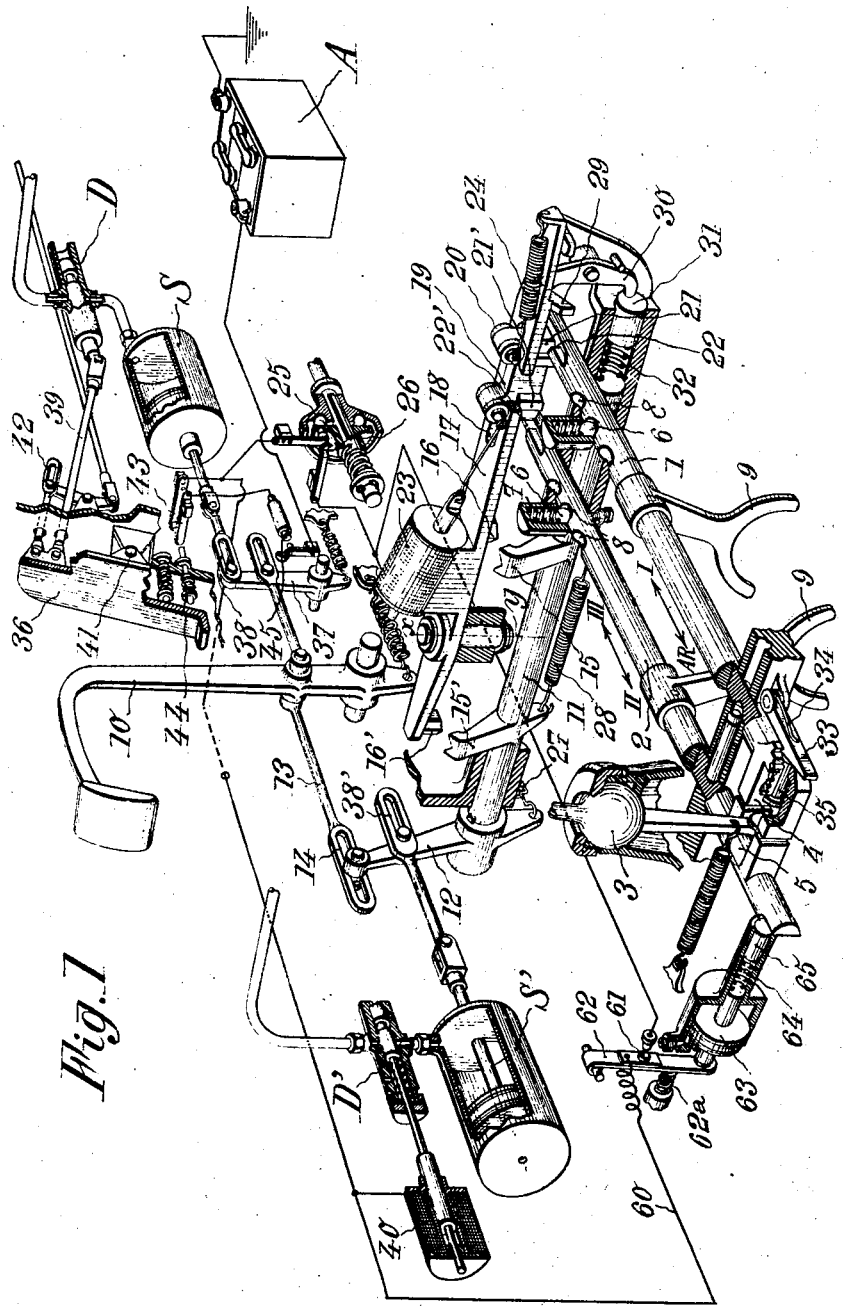
Fig. 1 is a diagrammatic perspective view of a three speed gear box made according to the present invention.

The gear box shown by Fig. 1 includes, in the known manner, two bars, 1 and 2 disposed side by side and slidable in their frame. These bars are subjected to the action of a gear lever 3, for instance of the swivel type which can, at will, be engaged either into a notch 4 of lever 1, to obtain first gear or reverse gear, or into a notch 5 provided in lever 2, in order to obtain second or third gear (the arrows indicate the direction of the displacement to be imparted to each bar to get into the gear combination marked at each end of said arrows).

I provide a temporary locking device, such, for instance as balls 6 subjected to the action of springs 7 tending to apply them into recesses 8 corresponding to the respective gear combinations or to neutral.

Rods 1 and 2 are provided with forks 9 adapted to act, in the known manner, upon the pinions of the gear box. Advantageously, the displacements of rod 1 are of greater amplitude than those of bar 2.

At right angles to the common direction of bars 1 and 2, I provide a shaft 11, capable both of sliding and of rotating in its bearings. This shaft is operatively connected to the clutch control pedal 10 through a lever 12 and a rod 13 provided with a slideway 14 in such manner that pedal 10 can disengage the clutch without modifying the angular position of shaft 11.

Said shaft carries two levers 15 and 15' provided, at their ends, with notches capable of co-acting respectively with lugs 16 and 16', respectively, according to the position of shaft 11 along its axis. Lugs 16 and 16' are carried by a pivoting bar 17 the pivot $x$—$y$ of which is located between said lugs.

Bar 17, which is substantially parallel to shaft 11, is caused to cooperate either with rod 1 or with rod 2, under the control of a relay device operated by a centrifugal device.

For instance, in a longitudinal groove 18 provided in bar 17, I provide a sliding member, such for instance as a carriage 19, advantageously provided with rollers 20.

This carriage carries two fingers 21 and 21' capable of engaging in housings 22 (provided in rod 1) or 22' (provided in rod 2), respectively, according to the position of carriage 19.

Bar 17 carries an electro-magnet relay 23 capable of displacing, when it is energized, carriage 19 against the action of a return spring 24 tending to engage finger 21 into housing 22 and thus to connect rod 1 with bar 17.

Electro-magnet 23 is subjected to the control of a centrifugal mechanism 25, for instance of the ball type, the speed of rotation of which is a function of the speed of the vehicle. This mechanism 25 is arranged to close a contact 26 when the speed of the vehicle exceeds a given limit, for instance 6 kilometers per hour. This contact 26 controls the energizing of the electro-magnet by a source of current A, and therefore the movement of carriage 19 toward bar 2 and the operative engagement of said bar 2 with bar 17.

I further provide, according to my invention, a spring 27 which tends to turn shaft 11 away from bar 17, and a spring 28 which tends to bring said shaft, by axial sliding, into the position for which lever 15 is located opposite lug 16.

Furthermore, between bar 17 and shaft 11, I provide means for elastically pushing back said shaft against the action of spring 28 when lever 15 pushes lug 16 and causes bar 17 to pivot. Such means may, for instance, consist of an inclined or oblique element 29 carried by bar 17 and adapted to coact with a rocking member 30 for ensuring, through a push piece 31, the compression of a spring 32 which bears against shaft 11. This spring 32 is sufficiently strong for pushing back said shaft 11, when the notch of lever 15 has left lug 16, into the position for which lever 15' is located opposite lug 16'.

When such a system is directly controlled through pedal 10, it works in the following manner:

When the vehicle is stopped, electro-magnet 23 is not energized and carriage 19 is engaged with rod 1. Spring 28 keeps shaft 11 in the position in which lever 15 is located opposite lug 16.

During the first part of its movement, pedal 10 produces the disengagement of the clutch. Then it causes shaft 11 to rotate against the action of spring 27. Lever 15 coacts with lug 16, which causes bar 17 to pivot in the direction corresponding, in view of the position occupied by carriage 19, to passing into first gear. In the course of this movement, oblique member 29 coacts with rocking member 30 so as to compress spring 32. When the driver releases pedal 10, spring 27 causes the end of lever 15 to leave lug 16 and spring 32 causes shaft 11 to slide so as to come into the position for which lever 15' is located opposite lug 16'. If, now, the speed of the vehicle increases until it exceeds the limit value above mentioned, electro-magnet 23 is energized and it tends to bring back carriage 19 into engagement with rod 2, but this movement of the carriage can take place only on the next operation of pedal 10. This operation of pedal 10 first produces a displacement of rod 1 in the opposite direction, since the point 16' of bar 17 that is now being pushed (by lever 15') is now located on the other side of axis x—y from point 16. Once bar 1 has come back into neutral position, as housings 22 and 22' are now in line, carriage 19 comes to engage with rod 2 and a further downward movement of pedal 10 will produce the shifting into second gear. Therefore, this shifting had been prepared automatically under the influence of the variation in the vehicle speed, after the passing into first gear.

When the driver releases the pedal after this passing into second gear, as oblique surface 29 no longer pushes rocking member 30, the action of spring 28 becomes preponderating and the whole of shaft 11 is moved in the direction of its axis until lever 15 comes opposite lug 16.

Supposing now that the speed of the vehicle remains higher than the limit value above mentioned, carriage 19 remains engaged with rod 2 and the next operation of pedal 10 will bring about the passing into third gear, with a compression of spring 32, then, when the driver releases said pedal, the return of shaft 11 into the position corresponding to the engagement of lever 15' with lug 16', which corresponds to preparing the shifting to second gear.

Therefore, as long as the speed of the vehicle is above the limit speed in question, the second and third gears are available, one of said gears being in service and the other automatically prepared for the next downward displacement of the pedal.

If, on the contrary, the speed of the vehicle drops below the limit above referred to when the second gear is in action, the action of spring 24 upon carriage 19 becomes preponderating and said carriage comes to engage with rod 1 (which was in neutral position). In this case also, the most favorable speed was automatically prepared.

Advantageously, the above means are completed by the provision of safety means adapted to prevent the shifting into reverse gear otherwise than under the effect of a special action of the driver. Such a safety device is for instance constituted by a locking member 33 which normally opposes the shifting into reverse gear, this locking member being subjected to the action of a spring 34 against the action of which it can be moved away from rod 1 by a push piece 35 housed in notch 4. It suffices for the driver to act on said push piece by means of lever 3 for shifting into reverse gear.

Concerning now the servo-motors which, according to the present invention, are provided for ensuring the operation of the mechanism above described, they are placed under the control of a single operating member. I have found that it is preferable to make use of the accelerator pedal 36 of the vehicle, which is adapted to be able to undergo displacements other than those corresponding to variations of the feed of fuel mixture to the engine.

Preferably, these servo-motors are of the suction type. They consist, for instance, of cylinder-piston systems S' and S respectively, the movable elements of which are connected respectively to the lever 12 which controls the gear changings and to the clutch lever 37, through the intermediate of the respective sliding connections 38' and 38, in such manner that the servo-motor-control is independent of that obtained through pedal 10, which it is advantageous to keep.

In order to operate these servo-motors, I provide two distributors or slide valves D' and D, respectively. They are controlled, for instance, either directly by a rod 39, as shown for the clutch control servo-motor S, or through an electric relay 40 as shown for servo-motor S'.

In particular, these various control members may be placed under the action of the accelerator pedal 36, and furthermore, according to another feature of the invention, the whole can be arranged in such manner that said pedal enables the driver to operate at will a free-wheel device. Such an arrangement is shown, by way of example, by Fig. 1.

This pedal 36 is adapted to oscillate about an axis 41 and it is connected to the throttle valve control through a slideway 42.

To this pedal 36, I couple the rod 39 which controls servo-motor S, in such manner that said servo-motor is operated by angular movements of pedal 36 in a direction opposed to that which corresponds to speeding up the vehicle.

This pedal is caused to coact with a contact 43, through a push-piece 44 arranged in such manner as to be operated only when rod 39 has already been caused to operate servo-motor S. This contact 43 ensures, when closed, the energizing of the electro-magnet 40 which operates slide valve D'.

It should be noted that it is possible, in order to increase the safety, to provide a supplementary contact 45 mounted in series in the feed circuit of electro-magnet 40, this contact being arranged in such manner as to be closed only when the clutch disengagement has taken place, so that there is no risk of the gears being shifted when the gear box is still coupled with the engine. I may for instance, in order to comply with this condition, subject said contact to the action of the clutch disengagement lever 37.

Furthermore, it is advantageous to arrange the parts in such manner that the closing of contact 43 permits the feed of current, through a shunt circuit, to the electro-magnet 23 which controls the displacements of carriage 19. In this way, I avoid any risk of the control electro-magnet 23 being fed with current at times when the driver is not shifting gears.

With such an arrangement, according to the amplitude of the pivoting displacements imparted to pedal 36 in the direction of the arrow the driver can at will perform either of the following operations:

(a) Either produce the disengagement of the clutch and thus render the vehicle free from the action of the engine, which corresponds to "free-wheel" running of the vehicle;

(b) Or, through an action of larger amplitude on said pedal, obtain the operation of the change speed device.

Such an arrangement, in which "free-wheel" running is controlled through the accelerator pedal, is particularly advantageous in view of the fact that, in usual automobile construction, the same foot controls both the accelerator and the brake.

Therefore, wherever the driver leaves the accelerator for acting on the brake, he automatically causes the vehicle to be operatively coupled with the engine, so that the braking action of the engine is added to that of the brakes.

Although the system above described is satisfactory, it seems that it is advantageous to provide the servo-motor S' (which control the gear changings) with means for producing a stopping, or at least a slowing, action when rods 1 and 2 are in neutral position, in order to facilitate, when it occurs, the passage of carriage 19 from one of the rods to the other one.

For this purpose, I may, for instance, arrange things so that, when rods 1 and 2 are near their neutral positions, there is a throttling in the distribution system of servo-motor S'. I may, for instance, make use of the arrangement disclosed by Fig. 2.

In this case, the distributor or slide-valve D' consists of a valve member 46 subjected to the action of an electro-magnet 40 and adapted, according as it is attracted or not by said electro-magnet, of bringing servo-motor S' into communication either with the suction of the engine or with the atmosphere.

I provide, between contact 43, the closing of which produces the energizing of the electro-magnet 40 and said electro-magnet, two circuits 47 and 47' mounted in shunt and in which I provide two movable contacts 48 and 48', contact 48 being normally closed and contact 48' opened.

Contact 48 is arranged to coact with a projection 49, carried for instance by the rod of the servo-motor, this projection ensuring the opening of said contact when bars 1 and 2 are in their respective neutral positions.

I interpose, between contacts 48 and 48', a dash-pot system, for instance of the air type, such that it ensures, with a certain delay, the closing of contact 48' when contact 48 has been opened by projection 49.

This dash-pot system may be made as follows:

In cylinder 50, I provide a piston 51 carrying a rod 52, extending on both sides thereof and adapted to coact at one of its ends with contact 48' and at its other end with contact 48 through the intermediate of a spring 53 and a push-piece 54.

Cylinder 50 is fitted with at least one inlet valve 55 and, advantageously, two discharge orifices 56 and 57 one of which is provided with a spring valve 58 whereas the other, to-wit 57, has its section adjusted by a screw 59.

The operation of this device is the following:

As long as bars 1 and 2 are not both in their neutral positions, the energizing of electro-magnet 40 takes place, when pedal 36 is depressed, through contact 48 and conductor 47, contact 48' being open. When that of said bars 1 and 2 with which servo-motor S' is coacting reaches its neutral (the other bar is already in its neutral position), projection 49 opens contact 48, pushes down push piece 54 and compresses spring 53. The latter then expands gradually as a consequence of the dash-pot effect produced by the escape, through orifices 56 and 57, of the air compressed by piston 51. At the end of its expansion, spring 53 ensures the closing of contact 48' and electro-magnet 40 is again energized through conductor 47'. This stopping of the energizing of said electro-magnet has for its effect momentarily to stop the feed of electro-magnet S' as a consequence of the fact that the latter communicates, during this interval of time, no longer with the engine but with the atmosphere.

Therefore, there takes place, in neutral a stopping favorable to the passage of carriage 19 from one of the rods 1 and 2 to the other. Once contact 48' is closed, said servo-motor is again fed, its rod starts again moving so as to ensure the shifting into the gear prepared in advance, and projection 49 ceases to act on contact 48, which closes, the energizing of electro-magnet 40 again taking place, as before the passing through the neutral position, through conductor 47.

It will be readily understood that the time of stopping above described can be varied by adjusting the orifices of the dash-pot.

For instance, I may stop for a certain time the operation of the gear box in neutral, by stopping orifice 56 by means of valve 58.

I may also permanently stop the gear mechanism in this neutral position by opening contact 44 during this time.

When the vehicle is stationary, the small leakage that keeps taking place through orifice 57 enables piston 51 to close contact 48' so that, the next time the vehicle is started, electro-magnet 40 can be energized and servo-motor S' can produce the shifting into first gear.

Advantageously, the three speed gear box above described is provided with means for permitting of shifting to the lower gear in the upper group (that is to say from third gear to second gear) when the speed of the vehicle drops below the limit speed corresponding to the energizing of the electro-magnet 23 which controls carriage 19.

For this purpose, for instance, electro-magnet 23 is fed with current through a second circuit 60 connected in shunt with the normal feed circuit of said electro-magnet and adapted to be closed when the third gear is in action.

In the example shown in the drawings, I provide on circuit 60 a contact 61 supported by a blade 62 elastically mounted, a spring 62a tending to close contact 61.

With blade 62, there is combined a dash-pot 63 of the kind of that shown in Fig. 2, this dash-pot having its movable element subjected to the action of a spring 64 and of a push-piece 65 which bears against bar 2, in which there is provided a recess arranged in such manner that when the gear box is in third gear push piece 65 ceases to compress spring 64.

The operation of this device is the following:

As long as the third gear is in action and whatever be the speed of the vehicle, contact 61 remains closed, permitting the energizing of electro-magnet 23 and therefore the engagement of carriage 19 on bar 2. When the driver, wishing to pass into second gear, brings said bar into neutral position, spring 64 is compressed, but dash pot 63 does not permit the opening of contact 61 immediately, and the delay in the opening of this contact permits of getting past the neutral position. Once the second gear has been engaged, if the speed of the vehicle keeps below the limit value the next change speed operation will engage into first gear, since, in the neutral position of bar 2, contact 61 will not be brought back into its closing position. If, on the contrary, the vehicle has accelerated to a speed higher than the limit value in question, the energizing circuit of electro-magnet 23 is closed by the certifugal mechanism and the passing into third gear is prepared or pre-selected, the closing of contact 61 taking place as soon as the shifting into third gear has taken place.

In the preceding description, it has been supposed that the displacements of bar 1 were of larger amplitude than those of bar 2.

Finally, in all cases, and in particular, as supposed in the following description by way of example, in the embodiment illustrated by Fig. 1, I may devise the system in such manner that once the reverse gear set in action by a special action of the driver (for instance by the release of a locking member 33), the latter has but to act upon the normal change speed control member for passing alternately into first gear or reverse gear, that of these two combinations which is not in service being automatically prepared or preselected, which considerably facilitates some maneuvers.

For this purpose, as shown by way of example by Fig. 3, rocking member 3 is fitted at the end of a rod 66 which further carries an abutment 67 capable of coacting with a finger 68, when rod 66 is pulled, for disengaging locking member 33 (which blocks the reverse gear) from its notch.

With such an arrangement, when said rod 66 is pulled:

On the one hand the reverse gear is released; and,

On the other hand, rocking member 30 is caused to slide along oblique surface 29, thus compressing spring 32 through the intermediate of push-piece 31, and pre-selecting the shifting into reverse gear, which will be brought into action the next time shaft 11 is acted upon.

Once this operation is performed, the preponderating action of spring 28 pre-selects the shifting into first gear and the alternate automatic shifting from first gear into reverse gear and inversely can be effected as long as a traction is exerted upon rod 66.

Whatever be the embodiment that is chosen, the gear box according to my invention has the following advantages:

It automatically prepares the shifting into the most favorable gear combinations, and prevents any possibility of shifting into disadvantageous or dangerous gear combinations;

It is perfectly smooth, therefor little expensive and reliable in operation.

Finally it can readily be adapted to existing gear boxes.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. In an automotive vehicle having an engine and comprising a clutch mechanism and a variable speed transmission mechanism, a servo-motor means for said clutch mechanism, means operatively connecting said servo-motor means to said clutch mechanism, a second servo-motor means for said transmission mechanism, means for operatively connecting said second servo-motor means to said transmission mechanism, said last connecting means including a preselecting device and means controlled in accordance with variations in the speed of some moving part of the vehicle to operate said preselecting device, a control element movable through different ranges, and means operatively connecting said control element to both said servo-motor means to control one of said servo-motor means during each range respectively.

2. In an automotive vehicle having an engine and comprising clutch mechanism, variable speed transmission mechanism and fuel control mechanism all operatively connected to said engine, a servo-motor means for said clutch mechanism, means operatively connecting said servo-motor means to said clutch mechanism, a second servo-motor means for said transmission mechanisms, means for operatively connecting said second servo-motor means to said transmission mechanism, said last connecting means including a preselecting device and means controlled in accordance with variations in the speed of some moving part of the vehicle to operate said preselecting device, a control element movable through three different ranges, means operatively connecting said control element to both said servo-motor means to control one of said servo-motor means during each of two of said ranges respectively, and means operatively connecting said control element to said fuel control mechanism to control the same during the third range.

3. In a system according to claim 1 in which said variable speed transmission mechanism includes a reverse gear, means for locking said reverse gear so that it is not engaged by said preselecting device.

4. In a system according to claim 1 in which said variable speed transmission mechanism includes a reverse gear, means for locking said reverse gear combination so that it is not engaged by said preselecting device, and means for bringing said locking means out of action.

5. In a system according to claim 1, means, associated with said second servo-motor, for slowing down the operation thereof, while said preselecting device is moving the variable speed mechanism past the neutral position thereof.

6. In an automotive vehicle having an engine and comprising clutch mechanism, variable speed transmission mechanism and fuel control mechanism all operatively connected to said engine, a control element movable through three different ranges, means operatively connecting said control element to each of said clutch and fuel control mechanisms to control said mechanisms in two different ranges of said control element, means operatively connecting said control element to said variable speed transmission mechanism to control said last mechanism in the third range of said control element, a preselecting device connected to said last connecting means and means controlled in accordance with variations of the speed of some moving part of the vehicle to operate said preselecting device.

7. In an automotive vehicle having an engine and comprising clutch mechanism, variable speed transmission mechanism and fuel control mechanism all operatively connected to said engine, a control element movable through three different ranges, means operatively connecting said control element to said fuel control mechanism to control said mechanism in the first of the ranges of said control element, servo-motor means for said clutch and variable speed transmission mechanisms, means operatively connecting said servo-motor means to said clutch and variable speed transmission mechanisms, and means operatively connecting said control element to said servo-motor means to control said clutch and variable speed transmission mechanisms in the second and third ranges respectively of said control element.

8. A system according to claim 7, further comprising a preselecting device connected to the means for operatively connecting said servo-motor means to said variable speed transmission mechanism, and means controlled in accordance with variations in the speed of some moving part of the vehicle to operate said preselecting device.

RAUL PATERAS PESCARA.